United States Patent
Omura et al.

(10) Patent No.: US 9,484,774 B2
(45) Date of Patent: Nov. 1, 2016

(54) SINGLE PHASE BRUSHLESS MOTOR

(71) Applicant: MINEBEA CO., LTD., Kitasaku-gun, Nagano (JP)

(72) Inventors: Yuji Omura, Haibara-gun (JP); Tomoaki Nakano, Fukuroi (JP); Masaaki Nishizawa, Kitasaku-gun (JP); Takahiro Sakaguchi, Kokubunji (JP); Shinichi Uchikawa, Kitasaku-gun (JP); Tomoyuki Tsukada, Kitasaku-gun (JP)

(73) Assignee: MINEBEA CO., LTD., Kitasaku (JP)

( * ) Notice: Subject to any disclaimer, the term of this patent is extended or adjusted under 35 U.S.C. 154(b) by 634 days.

(21) Appl. No.: 13/871,514

(22) Filed: Apr. 26, 2013

(65) Prior Publication Data

US 2013/0300249 A1 Nov. 14, 2013

(30) Foreign Application Priority Data

May 9, 2012 (JP) .................................. 2012-107282

(51) Int. Cl.
*H02K 1/14* (2006.01)
*H02K 29/03* (2006.01)

(52) U.S. Cl.
CPC ............... *H02K 1/14* (2013.01); *H02K 1/146* (2013.01); *H02K 29/03* (2013.01); *H02K 2213/03* (2013.01)

(58) Field of Classification Search
CPC ............ H02K 1/06; H02K 1/08; H02K 1/14; H02K 1/146; H02K 21/22; H02K 29/03; H02K 2201/03; H02K 2213/03; H02K 1/12148; H02K 1/165
USPC ....................... 310/216.091–216.094, 216.097
See application file for complete search history.

(56) References Cited

U.S. PATENT DOCUMENTS

| | | | | |
|---|---|---|---|---|
| 3,873,897 A * | 3/1975 | Muller | ............... | H02K 29/08 310/172 |
| 3,986,086 A * | 10/1976 | Muller | ............... | H02K 29/08 318/400.08 |
| 4,398,134 A * | 8/1983 | Muller | ............... | H02K 29/08 318/400.23 |
| 4,429,263 A | 1/1984 | Muller | | |
| 4,730,136 A * | 3/1988 | Muller | ............... | H02K 29/08 310/156.21 |

FOREIGN PATENT DOCUMENTS

| | | |
|---|---|---|
| JP | S55-29294 A | 3/1980 |
| JP | H04-56542 A | 2/1992 |
| JP | H06-253479 A | 9/1994 |
| JP | A-2006-333585 | 12/2006 |
| JP | 2010-004663 A | 1/2010 |

OTHER PUBLICATIONS

Jan. 13, 2016 Office Action issued in Japanese Patent Application No. 2012-107282.

* cited by examiner

*Primary Examiner* — Tran Nguyen
*Assistant Examiner* — Eric Johnson
(74) *Attorney, Agent, or Firm* — Oliff PLC

(57) ABSTRACT

A single-phase brushless motor has both superior start-up stability and low cogging torque. In the outer-rotor-type single-phase brushless motor, when a gap width between the rotor and one edge of the salient pole surface is defined as $d_1$, a gap width between the rotor and the other edge of the salient pole surface is defined as $d_2$, and a minimum gap width between the rotor and the salient pole surface is defined as $d_3$, the formula $d_3<d_1<d_2$ is satisfied, and the gap width is $d_3$ at a position shifted toward the one edge of the salient pole surface from the center of the arc shape which forms the salient pole surface.

4 Claims, 3 Drawing Sheets

SINGLE PHASE BRUSHLESS MOTOR

BACKGROUND OF THE INVENTION

1. Field of the Invention

The present invention relates to a single-phase brushless motor in which a salient pole of a stator has a specific structure.

2. Related Art

A structure of a salient pole of a stator core in an outer-rotor-type single-phase brushless motor, in which at both end portions in a rotation direction, a gap width is continuously varied in a rotation direction, so that a gap between a rotor and one end portion is made minimum and a gap between the rotor and the other end portion is made maximum, is disclosed in Japanese Patent Application Laid-Open No. 2006-333585.

In the single-phase brushless motor, there is a problem in which both superior start-up stability and low cogging torque are required. The start-up stability means a characteristic in which stable start occurs when electrifying is started from a stopped state. In order to obtain the start-up stability, it is effective that a tip shape of the salient pole of the stator core described in Japanese Patent Application Laid-Open No. 2006-333585 be formed so as to be asymmetrical in a circumferential direction. However, although the above structure described in Japanese Patent Application Laid-Open No. 2006-333585 is effective for increasing the start-up stability, there is a problem in that the cogging torque is increased. The cogging torque is nonuniformity in running torque, and it causes vibration or noise in the rotating of the motor.

Under these circumstances, an object of the present invention is to provide a single-phase brushless motor having both superior start-up stability and low cogging torque.

SUMMARY OF THE INVENTION

A first aspect of the present invention has an outer-rotor-type single-phase brushless motor including: a cylindrical rotor including a plurality of magnetic poles on an inner circumference surface thereof; and a stator core disposed inside of the rotor including a plurality of salient poles having an extending portion for winding a stator coil which extends in an outer direction from the rotational center, and a salient pole surface facing the magnetic pole at a rotor side, in which the salient pole surface is in an arc shape viewed from an axial direction, when a gap width between the rotor and one edge of the salient pole surface is defined as $d_1$, a gap width between the rotor and the other edge of the salient pole surface is defined as $d_2$, and a minimum gap width between the rotor and the salient pole surface is defined as $d_3$, a formula $d_3<d_1<d_2$ is satisfied, and the gap width is $d_3$ at a position shifted from the center of the arc shape that forms the salient pole surface toward the one edge of the salient pole surface.

According to the first aspect of the present invention, the single-phase brushless motor can be easily self-started by not being $d_1$ to $d_2$, even if it is used in a single-phase drive manner, and the cogging torque can be decreased by shifting the position of $d_3$ to the edge side in which the gap width is $d_1$.

A second aspect of the present invention has the single-phase brushless motor according to the first aspect, the inner circumference surface of the rotor viewed from an axial direction is a circle in which the center thereof is a rotational center, and a center position of curvature of the arc shape that forms the salient pole surface is different from a center position of the circle that forms the inner circumference surface of the rotor. According to the second aspect of the present invention, a structure in which a formula $d_3<d_1<d_2$ is satisfied and a position of $d_3$ is shifted from the center of the arc shape that forms the salient pole surface toward the edge in which the gap width is $d_1$, can be formed by a simple structure.

A third aspect of the present invention has the single-phase brushless motor according to the first or second aspect, the salient poles are four salient poles, the salient pole surfaces exist at an angle range of 80 degrees, plus or minus 2 degrees, when viewed from the center of curvature of the arc shape which forms the salient pole surface, and a position having the $d_3$ is shifted 27 degrees, plus or minus 3 degrees, from the center position of the angle range toward a direction of the one edge. According to the third aspect of the present invention, start-up easiness and low cogging torque can be further pursued.

A fourth aspect of the present invention has the single-phase brushless motor according to the third aspect, a gap width between adjacent edges in a circumferential direction on each salient pole surface of the four salient poles is at least 1 mm, and an angle width in a circumferential direction thereof is not more than 10 degrees. According to the fourth aspect of the present invention, driving current required to obtain the same running torque can be reduced, because the turn number of winding wire for winding around the salient pole can be increased.

A fifth aspect of the present invention has the single-phase brushless motor according to any of the first to fourth aspects, a mark is provided on the stator core to distinguish the right and left when viewed from an axial direction. The stator core in the present invention should be carefully handled in assembly, since the shape viewed from an axial direction is asymmetrical. According to the fifth aspect of the present invention, the difference in right and left viewed from an axial direction can be easily distinguished, and therefore, easiness of assembly is improved, and in addition, occurrence of an assembly error in which the right and left are confused is avoided.

According to the present invention, a single-phase brushless motor having both superior start-up stability and low cogging torque can be provided.

DESCRIPTION OF PREFERRED EMBODIMENTS

Structure

Figure 1:
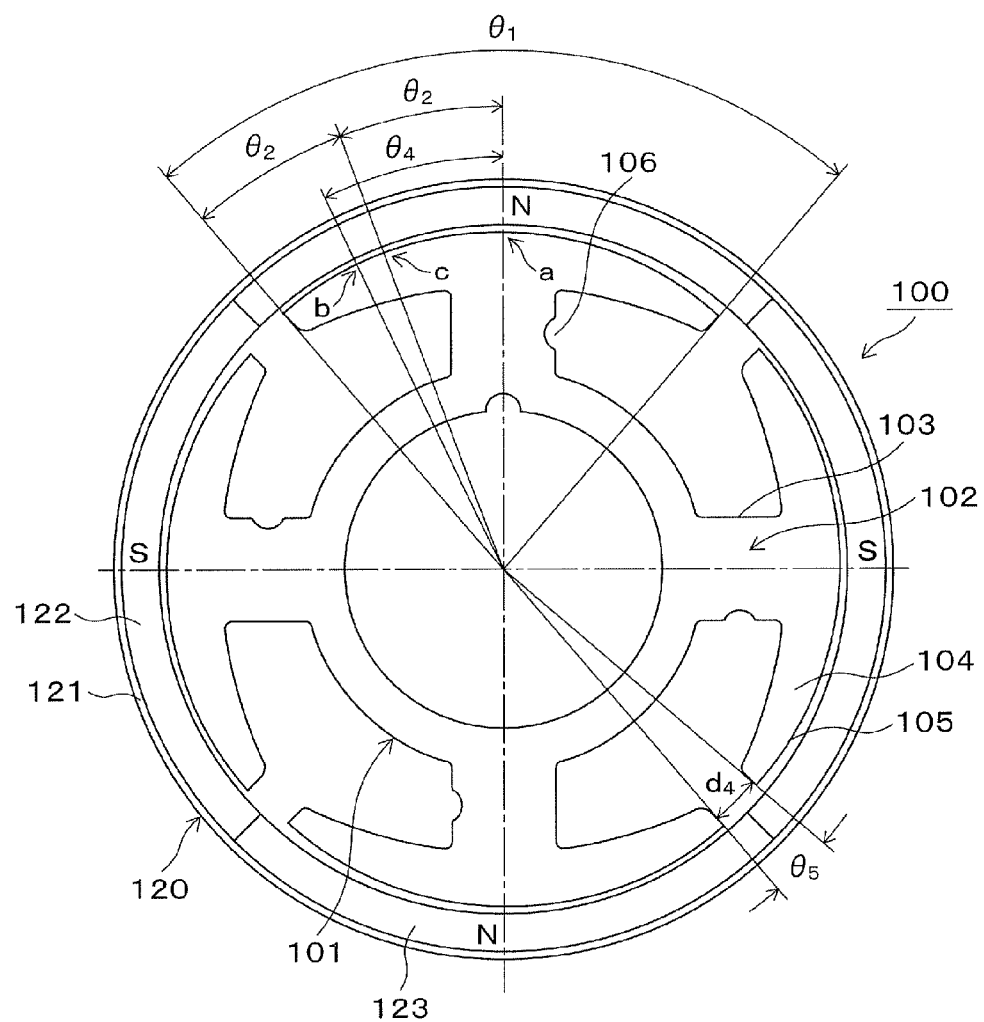
FIG. 1 is a conceptual diagram showing relationships between parameters in a single-phase blushless motor in accordance with an embodiment of the present invention.

FIG. 1 shows a single-phase brushless motor 100. The single-phase brushless motor 100 is an outer-rotor-type single phase brushless motor. The single-phase brushless motor 100 has a stator core 101.

Figure 3:
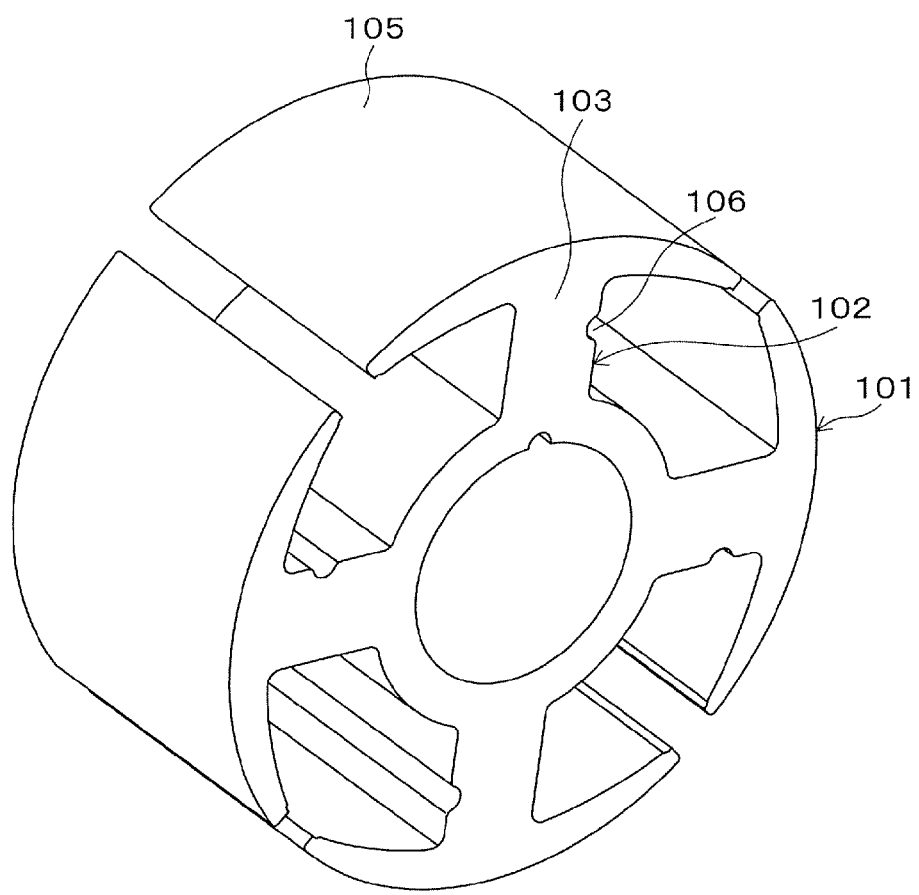
FIG. 3 is a perspective view showing a stator core of a single-phase brushless motor in accordance with an embodiment of the present invention.

FIG. 3 is a perspective view showing the stator core 101. The stator core 101 is formed by laminating a plurality of thin plates of magnetic material (for example, electrical steel, etc.) processed in a shape shown in FIG. 1. The stator core 101 has four salient poles 102. The salient pole 102 contains an extending portion 103 which extends in an outer direction from an axial center (rotational center), a tip portion 104 which exists at a tip of the extending portion and has a structure which is an opened umbrella shape when it is viewed from an axial direction, and a salient pole surface 105 which is an outer surface of the tip portion 104 and faces to inner circumference surface of a rotor described below via a gap. Stator coils (driving coils), not shown in the figures, are wound around the extending portion 103 of the salient pole 102. A connecting method of the stator coils wound to each of the salient poles 102 is the same as that in a general outer-rotor-type single-phase brushless motor having four poles.

The stator core 101 is stored inside of a cylindrical rotor 120. The rotor 120 includes a cylindrical rotor yoke 121, and cylindrical permanent magnet disposed inside of the rotor yoke 121, which are magnetized in a state of which S poles 122 and N poles 123 are alternately located along a circumferential direction. The rotor 120 is held in a state that is rotatable to the stator core 101 by a holding structure that is not shown in the figures. That is, the rotor 120 has a structure that is rotatable relative to the stator core 101 in a state in which the stator core 101 is stored therein.

A shape of the salient pole surface 105 viewed from an axial direction (viewed from a viewpoint in FIG. 1) is an arc. In addition, a shape of the inner circumference surface of the rotor 120 viewed from an axial direction is circular. A center (center of curvature) O of the arc that forms the salient pole surface 105 does not agree with a center O' (center of circle) of the inner circumference surface of the rotor 120, and is slightly shifted, although they are not obvious as shown in FIG. 1. Therefore, a distance in a circumferential direction between the salient pole surface 105 and the inner circumference surface of the rotor 120 is not certain. In the following, this point will be explained.

Figure 2:
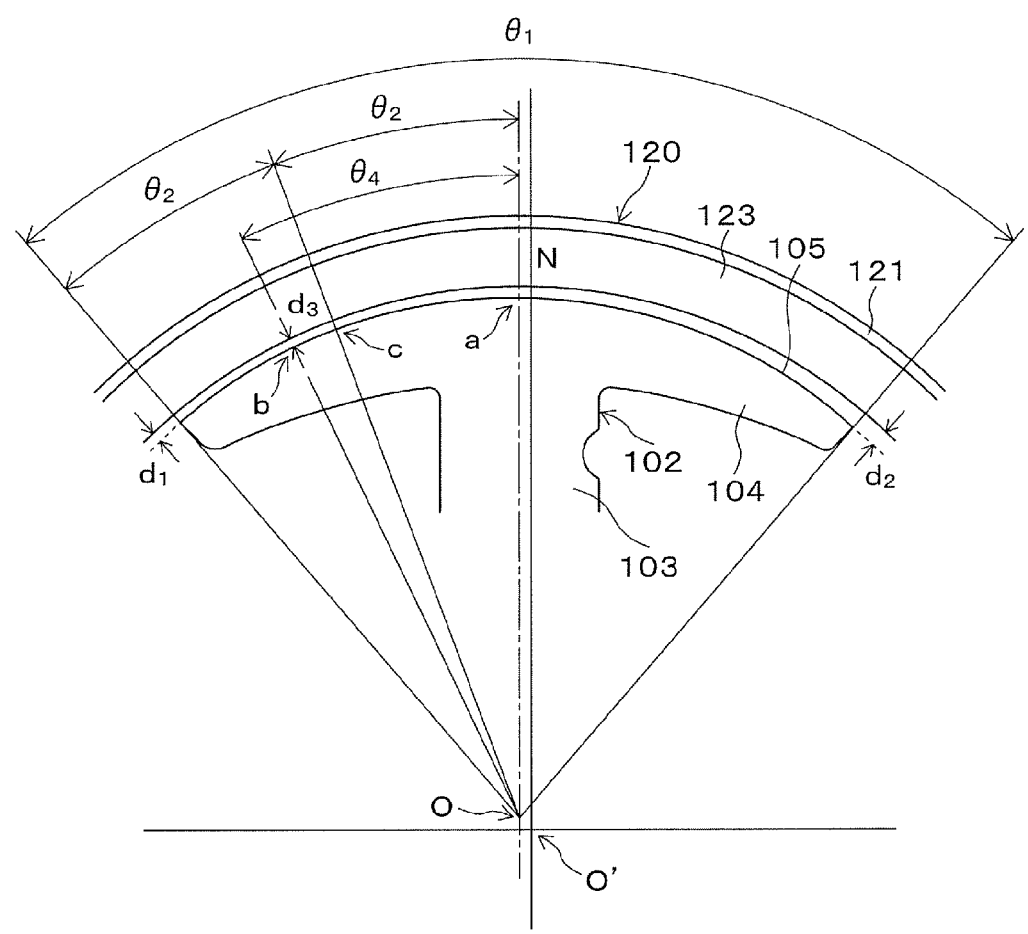
FIG. 2 is an enlarged view showing part of FIG. 1.

FIG. 2 is an enlarged view showing part of FIG. 1. First, the center O of the arc which forms the salient pole surface 105 is defined. The center O is shifted from the center O' (in rotation of the rotor) of the circle viewed from an axial direction which forms the inner circumference surface of the rotor 120, as described above. An angle range (an angle range between right and left ends) of the salient pole surface 105 viewed from the center O is defined as an open angle $\theta_1$. $\theta_2$ is a quarter angle range of the open angle $\theta_1$. $\theta_4$ is angle distance (gap width calculated by the angle) from a center position a of the angle range $\theta_1$ (a center position of the salient pole surface when it is viewed from an axial direction) to a position b of a gap width $d_3$ as described below.

FIG. 2 shows gap widths $d_1$ and $d_2$ between the rotor 120 and the both edges of the salient pole surface 105 viewed from an axial direction. Here, $d_1$ is a gap width at a left end, and $d_2$ is a gap width at a right end. In this example, a formula $d_1 < d_2$ is satisfied. Here, a position b in which a distance between the salient pole surface 105 and the inner circumference surface of the rotor 120 is the minimum value $d_3$ is set to a position which shifts angle $\theta_4$ from the center position a of the open angle $\theta_1$ toward a left side edge (position in which the gap width is $d_1$). The $d_3$ is the minimum value of the gap width between the salient pole surface 105 and the inner circumference surface of the rotor 120, and therefore, the relationship of $d_3 < d_1 < d_2$ is satisfied. This structure is realized by intentionally shifting the position between the center O of the arc which forms the salient pole surface 105 and the center O' (rotation center of the rotor 120) of the circle which forms the inner circumference surface of the rotor 120 viewed from an axial direction.

That is, the position b (position of the minimum gap width $d_3$) viewed from an axial direction is closer to the above one edge (position of the gap width $d_1$) than the position c of the center between the one edge (position of the gap width $d_1$) and the center position a (center position a of the open angle $\theta_1$) of the salient pole surface 105. In other words, the position b (position of the gap width $d_3$) exists at the one edge (the most left side in the case of FIG. 2) of a quarter angle range of the salient pole surface 105.

The open angle $\theta_1$ can be selected from 75 degrees to 85 degrees, and it is preferably selected from the range of 80 degrees, plus or minus 2 degrees. The $\theta_4$ is selected from the range of 27 degrees, plus or minus 3 degrees, when the $\theta_1$ is 80 degrees, plus or minus 2 degrees. According to these angle ranges, both superior start-up stability and low cogging torque can be provided, as described below.

In addition, the gap width $d_4$ of the salient pole surfaces 105 adjoined in a circumferential direction is an angle width of 10 degrees or less (this value is defined as $\theta_5$). Here, the $\theta_5$ is an angle width range viewed from the rotation center of the rotor 120. By setting $\theta_5$ to be 10 degrees or less, the turn number of winding wire for winding around the extending portion 103 of each salient pole 102 can be increased, and higher efficiency can be obtained. Specifically, the current value required to obtain the same running torque can be reduced. Here, the lower limit of the $d_4$ is about 1 mm. When the $d_4$ is below 1 mm, nozzles in a coil winding machine for winding the stator coil are not inserted into the gap, and it is difficult to wind the stator coil.

A mark (notch mark) 106 for specifying a direction of the stator core 101 (salient pole 102) is formed at one side of the extending portion 103 of the salient pole 102 viewed from an axial direction. As explained about the shape of the salient pole 102, the stator core 101 viewed from an axial direction shown in FIG. 1 or FIG. 2 has an asymmetrical shape in a right-left direction, and cannot be used when it is turned over. Then, a mark 106 having a notch structure is formed on a side surface of the extending portion 103 in order to easily distinguish the direction in assembly.

(Action)

Stable start-up can be carried out by setting a difference between the $d_1$ and the $d_2$. In the case in which there is no difference between the $d_1$ and the $d_2$ and the gap width between the salient pole surface 105 and the inner circumference surface of the rotor 120 does not change according to position and is a certain distance, a situation in which the rotor 120 is not rotated in a single-phase drive (that is, start-up cannot be carried out) occurs. In contrast, when there is a difference between the $d_1$ and the $d_2$ as the present embodiment, magnetic force which works at right and left sides of the salient pole surface 105 is unbalanced, and therefore, stable start-up can be carried out, even in the single-phase drive.

In addition, in the case in which the stable start-up is prioritized, cogging torque is increased. However, the position b in which the gap width between the salient pole surface 105 and the inner circumference surface of the rotor 120 is a minimum is set to be a shown position, and as a result, stable start-up can be carried out and the cogging torque can be decreased.

Test Data

Samples that vary in each parameter are produced, and the result evaluated using these samples is shown in Table 1. Here, Comparative Example 3 satisfies a formula $\theta_4 > (\theta_1/2)$, and a position corresponding to b shown in FIG. 2 exists at a virtual more outer side of the left end of the salient pole surface 105. In this case, the $d_1$ is a minimum value of the gap width.

TABLE 1

|  | Example 1 | Example 2 | Example 3 | Comparative Example 1 | Comparative Example 2 | Comparative Example 3 |
|---|---|---|---|---|---|---|
| Maximum Outer Diameter | 19.6 mm | 19.6 mm | 19.6 mm | 19.6 mm | 19.6 mm | 19.6 mm |
| $\theta_4$ | 27.8° | 27.3° | 28.1° | 21.9° | 31.9° | 53.9° |
| $\theta_1$ | 78.3° | 78.3° | 81.2° | 78.3° | 78.3° | 78.3° |
| $d_4$ | 2.0 mm | 2.0 mm | 1.5 mm | 2.0 mm | 2.0 mm | 2.0 mm |
| $d_2-d_1$ | 0.15 mm | 0.15 mm | 0.15 mm | 0.35 mm | 0.30 mm | 0.35 mm |
| Start-up Stability | ○ | ○ | ○ | Δ | X | ○ |
| Cogging Torque | ○ | ○ | ◎ | X | X | Δ |
| Torque in 6 V Loading | 5.67 mNm | 5.99 mNm | 5.65 mNm | 5.43 mNm | 6.09 mNm | 5.13 mNm | circleincircle: excellent
largecircle: good
delta: moderate
times: poor

As is apparent from Table 1, in the case in which $\theta_4$ is below 22 degrees (Comparative Example 1) and the case in which it exceeds 32 degrees (Comparative Example 2), evaluation of the start-up stability and the cogging torque is decreased. In addition, it is proven that superior properties are obtained when the $\theta_4$ is about 27 degrees. Thus, it is concluded that self-start-up easiness and low cogging torque characteristics are obtained when the $\theta_4$ is an angle range of 27 degrees plus or minus 3 degrees. Here, a structure in which gap width between the salient pole surface and the rotor is made minimum at an edge of the salient pole surface, such as that of Comparative Example 3, is suitable because superior start-up stability is obtained. However, satisfied cogging torque characteristics cannot be obtained, since the effect of imbalance in a right and left direction of the salient pole viewed from an axial direction is remarkable.

Superior Effects

In the outer-rotor-type single-phase brushless motor, the start-up stability can be maintained and the cogging torque can be reduced. In addition, by setting the $\theta_5$ to be 10 degrees or less, the turn number of the stator coil which winds around the salient pole 102 can be increased, and current value of driving current required to obtain the same running torque can be decreased. Furthermore, since the stator core 101 has an orientation, it should be carefully handled in a right and left direction viewed from an axial direction. Therefore, by forming mark 106, assembling characteristics can be improved and occurrence of an assembly error in which the right and the left are confused can be avoided.

Other Matters

The present invention is not limited to each explained embodiment and includes modifications that will be obvious to those skilled in the art, and the effects of the invention are not restricted to those of the above embodiments. That is, various additions, modifications, and partial omissions are possible within the scope of the concept of the invention and the objects of the invention, as claimed, and equivalents thereof.

The present invention can be applied to an outer-rotor-type single-phase brushless motor.

What is claimed is:

1. An outer-rotor-type single-phase brushless motor comprising:
    a rotor including a plurality of magnetic poles on an inner circumference surface thereof; and
    a stator core disposed inside of the rotor including:
        a plurality of salient poles having an extending portion for winding a stator coil which extends in an outer direction from a rotational center of the rotor, and
        a salient pole surface facing the magnetic pole at a rotor side,
    wherein the salient pole surface of each of the salient poles has an arc shape from one edge to an other edge thereof viewed from an axial direction,
    when a gap width between the rotor and the one edge of the salient pole surface is defined as $d_1$, a gap width between the rotor and the other edge of the salient pole surface is defined as $d_2$, and a minimum gap width between the rotor and the salient pole surface is defined as $d_3$, a formula $d_3<d_1<d_2$ is satisfied,
    $d_2$ is a maximum value of the gap width between the rotor and the salient pole surface,
    $d_3$ is arranged at a position shifted from a midpoint of the arc shape that forms the salient pole surface toward the one edge of the salient pole surface,
    the inner circumference surface of the rotor forms a circle having a center at the rotational center, and
    a center of curvature of each arc of each of the salient poles is shifted from the rotational center of the rotor.

2. The single-phase brushless motor according to claim 1, wherein the salient poles are four salient poles,
    the salient pole surfaces are present at an angle range of 80 degrees, plus or minus 2 degrees, when viewed from the center of curvature of the arc shape which forms the salient pole surface,
    a midpoint of the angle range is positioned at the midpoint of the arc shape, and
    the position having the $d_3$ is shifted 27 degrees, plus or minus 3 degrees, from the midpoint of the angle range toward a direction of the one edge.

3. The single-phase brushless motor according to claim 2, wherein a gap width between adjacent edges in a circumferential direction on each salient pole surface of the four salient poles is at least 1 mm, and an angle width in a circumferential direction thereof is not more than 10 degrees.

4. The single-phase brushless motor according to claim 1, wherein a mark is provided on the stator core to distinguish the right and left when viewed from the axial direction.

* * * * *